United States Patent [19]

Kydonieus et al.

[11] 4,212,153
[45] Jul. 15, 1980

[54] TIME COLOR INDICATOR

[75] Inventors: Agis F. Kydonieus, New York, N.Y.; Inja K. Smith, West Orange, N.J.; Reid A. Conroy, York, Pa.; Ernest A. Pedicano, Greenwich, Conn.

[73] Assignee: Herculite Protective Fabrics Corporation, New York, N.Y.

[21] Appl. No.: 875,723

[22] Filed: Feb. 7, 1978

[51] Int. Cl.² ............................................. G04F 13/00
[52] U.S. Cl. ..................................... 368/62; 428/353; 428/88; 116/216; 116/207
[58] Field of Search ................. 58/1 R; 116/114 AM, 116/114.5, 114 V; 73/356, 358; 204/195 R; 426/88; 260/29.7 E; 428/353

[56] References Cited
U.S. PATENT DOCUMENTS

| 2,337,534 | 12/1943 | Barber | 58/1 R |
| 3,078,182 | 2/1963 | Crone, Jr. et al. | 428/353 |
| 3,520,124 | 7/1970 | Myers | 58/1 R |
| 3,999,946 | 12/1976 | Patel et al. | 426/88 X |

*Primary Examiner*—Ulysses Weldon
*Attorney, Agent, or Firm*—Sughrue, Rothwell, Mion, Zinn and Macpeak

[57] ABSTRACT

A laminated indicator which changes in a visually perceptible mode with the passage of time and a method for making such an indicator. At least two layers are provided whereby the molecular migration of an agent in an interior layer to the outermost surface of the exterior layer causes a change which can be visually percepted, e.g., a change in color or shade. Preferred embodiments include the migration of a dye or the migration of an acid or base wherein the outermost layer has the other member of an acid-base pair and a pH indicator.

18 Claims, 6 Drawing Figures

TIME COLOR INDICATOR

BACKGROUND OF THE INVENTION

Numerous devices have been proposed which provide a visual indication of the passage of a pre-arranged amount of time.

Time indicators are useful when attached to perishable items in indicating the length of time the items have been on the wholesaler's or retailer's shelf. Thus, foods and other perishable items such as photographic materials can be provided with indicators which evidence a visual change, after being activated, after the passage of a predetermined period of time.

Time-temperature indicators are also known which may indicate a visual change as a function of both time and temperature. Such devices are useful when attached to frozen foods since it may be undesirable to subject such frozen items to both high temperatures for a short period of time and relatively low but above-freezing temperatures for relatively longer periods of time. Further, the frozen food may be storable indefinitely at a very low temperature and the time-temperature indicator should take this all into account.

It is apparent that even straight time indicators which are not described in terms of giving a visual change dependent upon temperature are nevertheless somewhat dependent in yielding a visual change upon the temperature. Thus, while time-temperature indicators may utilize the freezing and thawing phenomenon of a particular material to incorporate the temperature factor into the scheme of when the indicator should produce a visual change, virtually any mechanism which is indicated as being dependent upon time is also, at least to a minor extent, dependent upon temperature.

A straight time indicator is described in U.S. Pat. No. 3,962,920 wherein a reservoir pad of paper or other coarse absorbent material is separated from a wick, such as a piece of blotter paper having fine porosity, by an impervious film to prevent contact between the reservoir pad and the wick. After the impervious films is removed, the agent in the reservoir is allowed to travel through the wick whereupon the progress of this movement is observed through a clear window. The agent can be a dye or one member of a co-reactant pair, the other member of which is in the wick. Alternatively, the device can be prepared without an impervious film at a temperature where the agent is a solid whereupon the device would be considered more of a time-temperature indicator.

Other wicking devices are described in U.S. Pat. Nos. 2,896,568, 3,046,786, 3,243,303 and 3,954,011.

Frozen food tell-tale devices are described in U.S. Pat. Nos. 2,951,764, 3,118,774 and 3,414,415. Such devices indicate that the food package to which it is attached has been subjected to a thawing temperature or a thawing temperature for a period of time sufficient to indicate disposal of the item.

An acid-base type indicating mechanism for a frozen food tell-tale device is described in U.S. Pat. No. 2,716,065. A more recent application of the acid-base indicating mechanism is set forth in U.S. Pat. No. 3,942,467 which also contains a review of this technology.

The use of a gaseous agent to produce a color change is described in U.S. Pat. No. 3,996,007. The gas is generated in a rate-controlling pouch and is either acidic or basic. After passing through the rate-controlling film, the gas comes into contact with an absorbent wick containing a pH sensitive dye and the other component of the acid-base pair.

A straight time indicator is described in U.S. Pat. No. 4,028,876 wherein one agent is contained in a capsule immersed in a liquid in a transparent pouch. After breaking the capsule, the agent is diluted in the liquid and permeates another capsule to change the liquid color.

Other time indicators are described in U.S. Pat. Nos. 1,843,234, 3,479,877, 2,553,369 and 2,560,537.

However, a need exists in the art for a time indicator which is structurally integrated, solid but with any desired degree of flexibility and which is resistant to breakage or partial breakage whereby the indicating mechanism would be prematurely initiated.

SUMMARY OF THE INVENTION

It has been found that a time indicator can be produced with a wide range of uses and applications by minor modifications to the basic invention. An outer solid polymer substrate is provided with a solid polymeric composition thereunder containing an agent which, upon migration through the outer substrate, produces a visual change at the outside surface thereof. A wide variety of indicating mechanisms can be employed including dye migration and acid-base neutralization with a pH indicator being present. Further, a wide variety of additional layers can be incorporated in order to provide increased rigidity, increased strength, increased period between activation and indication and the ability to be adhesively applied to a surface when desired.

DETAILED DESCRIPTION OF THE INVENTION

Figure 1:
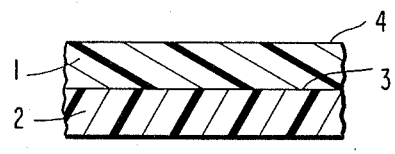
FIGS. 1–4 show cross sections of laminates corresponding to embodiments of the present invention wherein an agent is present in layers 2, 6 or 15 and migrates to the outer surface of substrates 1, 5 or 16.

In reference to FIG. 1, a simple embodiment of the present invention provides for a solid polymeric substrate 1 being adhered at surface 3 to a solid polymeric composition 2 whereby an agent in layer 2 migrates throughout and to the outside surface 4 of substrate 1. Hereinafter, substrate 1 having the characteristic of allowing migration of the agent and having an outside surface from which visual perception will be made will be referred to as the "indicator layer." Layer 2 or any combination of layers having the function of containing the agent but being in the interior of the laminate will be referred to as the "reservoir layer."

The term "agent" as used herein indicates a material which is initially contained only in the reservoir layer and which directly or indirectly causes a visual change in the outer surface of the indicator layer.

The indicator layer is a solid sheet or film of a nonporous polymer which allows migration of the chosen agent through and to its opposite surface. Examples of such polymers include plasticized PVC (polyvinyl chloride), semiplasticized PVC, rigid PVC, acrylics, polyurethanes and hytrel, and polymers and lamination techniques described in U.S. Pat. No. 3,075,938. The thickness of the indicator layer can be adjusted depending upon the time period to be indicated and the migrating species. In general, the thickness will be up to about 14 mils, most preferably from about 2 to 14 mils.

The indicator layer can be comprised of one or more sheets of polymeric materials which can be bonded together by double faced pressure sensitive tape, heat lamination or adhesives such as urethane based adhesives.

In a given indicator system, e.g., the dye 2',7'-dichlorofluorescein which would migrate from the reservoir layer to the surface of the indicator layer, it may be desirable to increase the time period between activation and the indication at the surface. This can be accomplished by the choice of an adhesive, providing polymeric layers with higher backbone stiffness, a thicker outer layer or less plasticizer in the outer layer. Additionally, the time period can be extended by laminating a second or further layer which can be the same polymeric sheet as the first indicator layer but could also be a polymeric sheet with a lower or higher tendency to pass a particular agent.

The indicator layer or layers will contain one or more components of the indicating system if such is necessary. For example, in an acid-base indicating system, either the acid or base and a pH sensitive dye would be incorporated into the indicator layer. This can be accomplished by extruding the materials together, calendering or mixing in a Banbury mixer. Further, the indicator layer may contain additives such as pigments, plasticizers and stabilizers.

Figure 2:
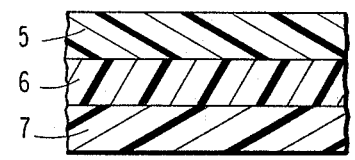

The polymeric composition designated as the reservoir layer and containing the agent which will eventually migrate can be preformed or may be formed by simply mixing a polymer with the desired agent followed by coating, spraying, dipping, immersing, printing, dusting or sheet-to-sheet bonding or laminating the composition to the indicator layer or to a barrier layer such as layer 7 in FIG. 2.

When preformed, the reservoir layer can be formed by coating a plastisol containing the agent onto a barrier layer and fusing at 280° to 300° F., by extruding the polymer and agent, by layering down the reservoir as an ink, e.g., mixing the polymer, agent and a solvent such as methyl ethyl ketone or acetone, and allowing the solvent to evaporate or by laying down a latex emulsion and allowing the water to evaporate.

If the reservoir layer is formed by coating or otherwise adhering the composition to the indicator layer or to a barrier layer, such is preferably upon the barrier layer, since this will allow activation of the indicator thereafter instead of at the formation of the reservoir layer.

Polymers which can be used in forming the reservoir layer include a vinyl chloride/vinyl acetate copolymer, a urethane polymer, a polyolefin, hytrel and polyvinyl chloride. Preferably, the reservoir layer is formed from extrusion or from a polyvinyl chloride plastisol formed by mixing polyvinyl chloride in particulate form with a plasticizer, the agent and other optional ingredients including stabilizers, thickening agents and fillers. Most preferably, the reservoir is formed from a plastisol.

The reservoir layer can advantageously be up to about 20 mils in thickness, preferably from about 1 to 20 mils, most preferably about 1 to 5 mils.

Although the indicator of the invention can be created by bringing layer 2 into contact with layer 1 as shown in FIG. 1, the reservoir layer is preferably mounted upon a barrier layer shown as 7 in FIG. 2 prior to bringing indicator layer 5 into contact with reservoir layer 6. Although in most applications it would only be desirable to have visual perception at one surface, it is possible that all outer surfaces of a laminate should produce a visual change. Thus, although layer 7 in FIG. 2 is advantageously a barrier layer so as to prevent needless migration of the agent therethrough, layer 7 could nevertheless be an indicator layer as well as layer 5.

Thus, when the device is to be attached in strip form to a surface, layer 7 is a barrier to migration. Such barriers can include sheets of metal foil, Mylar (polyethylene terephthalate) or cellophane. The thickness of the barrier layer 7 can vary widely since its main function is as a support for the reservoir layer but it may also be used to provide rigidity to the indicator device itself. Advantageously, the thickness of the barrier layer can be from about 0.5 to 2 mils, preferably from about 0.5 to about 1 mil.

Figure 3:
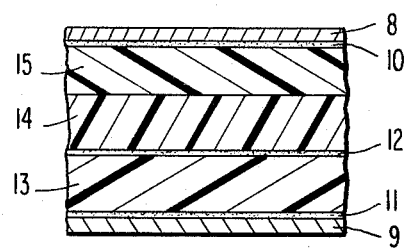
Figure 4:
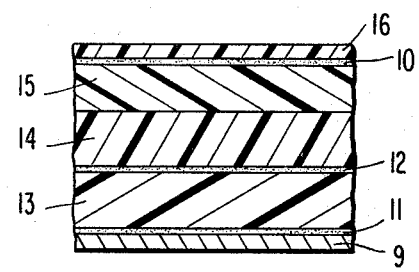

FIG. 3 indicates a cross section of what is essentially a reservoir which can be used in the present invention. Thus, the actual reservoir layer 15 is formed by coating upon barrier layer 14. The composite of layers 14 and 15 is then provided with adhesive layer 12 and bonded to support 13 having adhesive 11 and release sheet 9 attached thereto. On the side of the reservoir layer 15 opposite the barrier 14, an adhesive layer 10 is provided with release sheet 8. In order to activate the indicator, release sheet 8 is peeled away, leaving adhesive 10, and indicator 16 is then laid upon the composite as shown in FIG. 4. Alternatively, the reservoir can be as in FIG. 3 without layers 8 and 10 and the indicator layer 16 would be provided with 8 and 10. Thus, upon removal of release paper 8 from the 8-10-16 laminate, layers 10 and 16 would be adhered to the reservoir by means of adhesive 10. Before or after this procedure release sheet 9 can be peeled away whereupon the composite can be adhered to a food package, air filter or baking soda box. Thus, the indicator upon being activated can be used to produce a visual change which would indicate that the food in the package should be discarded, the air filter should be changed or the baking soda placed in a refrigeration should be replaced.

Release papers, such as those designated 8 and 9 in FIG. 3, are readily available as two-layered or four-layered release sheetings. With a two-layered sheeting comprising the paper and the adhesive, problems may be encountered since when attempting to unroll a commercial product quickly in production, the paper itself must have differential release properties on its two sides or the adhesive may partially stick to the back side of the paper. For example, if the sheeting comprising layers 8 and 10 in FIG. 3 is obtained from a roll, adhesive 10 may partially adhere to the top as well as the bottom of paper layer 8. This problem may be remedied by using a back side coated paper or a four-layered sheeting, such as would be made from layers 9, 11, 13 and 12. Thus, if support 13 exhibits a stronger bond to adhesive 12 than release paper 9, a roll of these four layers will unroll easily without having adhesive 12 stick to the back side of paper 9. Release papers can be formed from paper, metal foil or a variety of plastic sheets.

Adhesives which can be used as layers 10, 11 and 12 include thermosetting or thermoplastic pressure-sensitive acrylics or rubbers. The adhesive layer can be preformed and applied as a sheet, applied with another layer such as release sheet 8 or 9 or can be applied by conventional techniques such as coating.

The reservoir can also be formed by printing a reservoir composition on mylar or aluminum foil which has been previously or is subsequently attached to a package or other base for the indicator.

The visual system can comprise a single or multiple components.

A single component visual system can consist of one or more dyes which are initially present only in reservoir layer 2, 6 or 15 but which migrate through indicator layers 1, 5 or 16 to be perceptible at the outer surface thereof.

A two-component visual system can be used wherein the indicator layer would contain one or more dyes which would be bleached by the action of a bleaching agent initially present only in the reservoir layer but which migrates through the indicator layer and therein bleaches the dyes present. Further, an example of a two-component system would be a material present in the indicator layer having no color or shade but whose color or shade changes by direct reaction with an agent initially present only in the reservoir layer but which migrates throughout the indicator layer.

An additional two-component visual system could be that described in U.S. Pat. No. 3,962,920 wherein one of the two components of a color-producing chemical co-reactant pair is present in the indicator layer and the other co-reactant migrates from the reservoir layer. This patent mentions systems such as dithiooxamide or N,N'diorgano substituted derivates of dithiooxamides as one of the chemical co-reactants and a metal salt such as nickel rosinate as the other co-reactant. These materials react to provide a characteristic purple color complex. A preferred co-reactant system described in this patent comprises N,N'-bis-(2-octanoyloxyethyl) dithiooxamide as the first co-reactant and nickel rosinate as the second co-reactant chemical.

A three-component visual system can be an acid, base and a suitable pH sensitive dye wherein the acid or base would be present in the reservoir and the other two components would be present in the indicator layer.

In general, an organic dye can be a migrating agent in the present invention. Dyes that are extremely bulky with respect to molecular structure or are highly polymeric will show a reduced migration speed.

Dyes which can be used in the one-component system include Eastman Dye FFBL #8272 (Red) and Eastman #373 (2',7'-dichlorofluoresceing), referred to in Eastman catalog JJ-196.

Examples of pH sensitive dyes include those mentioned in U.S. Pat. No. 3,996,007 indicates phenolphthalein, xylenol blue, Nile blue A, n-cresol purple, bromo cresol green, O-cresol red, cyanidine chloride, bromo cresol purple, alizarin, thymol blue, bromophenol red, methyl red, acid, fuchsin, brilliant yellow extract, bromo thymol blue, phenol red, etc. as well as copper or cobalt halides which can form complexes, e.g., with ammonia or water which exhibit a color change upon complexing.

The amount of dye or other agent incorporated into the reservoir layer will depend upon the intensity of the color produced by the visual system, thickness of the indicator layer, desired time period for the device to record and the ability of the reservoir to receive and hold the dye. A further consideration would be the visual appearance of the indicator layer before migration as compared to the appearance after migration. For example, if high contrast is afforded by the visual system such as by the migration of a black dye to the surface of a white indicator layer, the amount of dye incorporated would be lower than that used if the indicator layer was gray.

Figure 5:
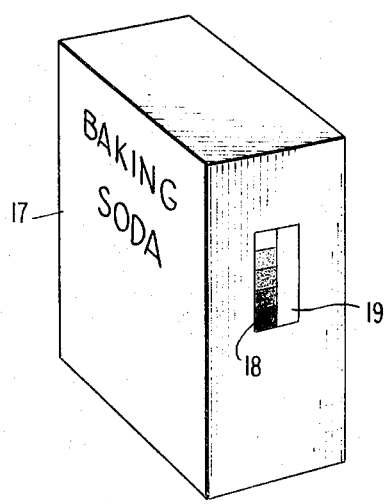
FIGS. 5 and 6 illustrate specific applications for the invention in providing indicators for a baking soda box and an air filter, respectively.
Figure 6:
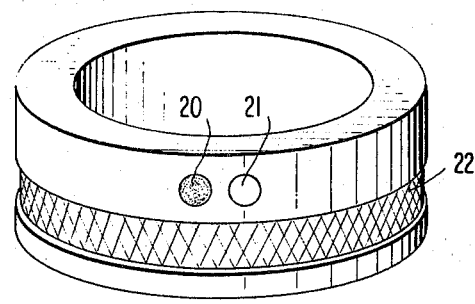

Preferably, the indicator will be placed in close proximity to a test color panel which will exhibit one or more colors or shades against which to compare the developed color or shade. In FIG. 5, a baking soda or other box 17 is provided with a step-wedge of color or shade 18 and a space 19 for applying the indicator itself or indicator layer over the pre-applied reservoir. The step-wedge can be provided with indicia corresponding to the time period required to develop the color at each step of the wedge. Alternatively, a simple reference color or shade 20 can be provided next to the space 21 for the indicator itself or indicator layer to be applied over the reservoir, as shown on an air filter 22 in FIG. 6.

The size of the composite laminated indicator according to the present invention can vary considerably according to the distance an observer would normally be located from the device, the size of the article to which the device is to be attached, etc. The indicator can be fashioned into square, rectangular, circular or any other convenient shape, with or without an adhesive for application to the article. Specific applications of the indicator include frozen food packages, perishable food packages kept at room temperature, air filters or baking soda boxes used in refrigerators. Another application would be in printed media such as greeting cards whereby the sender would activate the indicator and the recipient could read an ordinary printed message and a "delayed" message which would appear after a predetermined time period. This could be done by printing the reservoir in the shape of words or using a stenciled barrier layer.

Preferably, the indicator and reservoir layers are kept apart until initiation of the time period to be measured is desired. This can conveniently be accomplished by providing an intermediary barrier layer to be removed from a composite laminate at initiation or by attaching the indicating layer to the reservoir by a pressure sensitive adhesive at the time of initiation of the time period.

The time period from initiation and activation of the indicator to the visually perceptible event depends upon the migration speed of the agent which in turn is dependent upon the concentration of the agent in the reservoir, the thickness of the solid non-porous indicator layer, the molecular weight of the agent, the chemical functionality of the agent and the stiffness of the backbone of the polymer used as the indicator layer. Mathematically, the molecular migration process is governed primarily by Henry's Law and Fick's Law, see "Diffusion in Polymers," Crank and Park, Editors, Academic Press, New York, and "The Permeability of Polymers to Gases, Vapours and Liquids" by Richards, ERDE (Ministry of the Defense), Technical Report No. 135, March 1973 (NTIS No. AB-767,627).

The molecular migration of the agent can be visualized as the reorientation of several segments of the polymer chain in the indicator layer to allow passage of the agent from site to site. The higher the molecular weight of the agent, the more segments are needed to be re-oriented for the passage to be possible. Likewise, a stiffer polymer, i.e., being glassy with high crystallinity, the more difficult the re-orientation of the segments. Thus, it has been found that migration is most efficient through flexible polyvinyl chloride having a high plasticizer content followed generally by rigid polyvinyl chloride and acrylic such as Korad, polypropylene, nylon and polyester.

The rate of molecular migration also depends upon the molecular weight of the agent. Thus, in comparing the migration of dodecenyl acetate having 14 carbon atoms with octadecenyl acetate with 20 carbon atoms through a sheet of flexible polyvinyl chloride 2 mils in thickness, it was found that the diffusion rate of the dodecenyl acetate was about 20 times faster than that of the octadecenyl acetate.

Additionally, the chemical functionality of the agent will affect the migration speed. Thus, the similarity of the functionality of the agent to the functionality of the polymer will aid migration. However, it is apparent from this review that once the migration speed of a given agent in a known reservoir concentration through a particular indicator layer is known, the speed can be adjusted up or down to a more desired level by adjusting the indicator layer thickness, indicator layer identity, reservoir concentration or by interposing barrier layers.

The invention will now be described by several examples which are not to be taken as limiting the invention.

EXAMPLE 1

A polyvinyl plastisol was formulated by mixing the following ingredients at 73° F. at 500 rpm in a model RZR 30 mixer, obtained from the Polyscience Corp. of Niles, Ill.

| Component | Parts by Weight |
| --- | --- |
| Eastman Dye #373 (violet) | 4.0 |
| Dioctyl phthalate (plasticizer) | 35.0 |
| V-1515 (stabilizer, obtained from Nuodex Div. of Tenneco, Piscataway, N.J.) | 1.0 |
| Polyvinyl Chloride Resin #6338 (Firestone, Pottstown, Pa.) | 60.0 |
| Total | 100.0 |

Three mils of the plastisol was coated on a Mylar film and fused at 295° F. A layer of pressure-sensitive adhesive was applied thereover and a five mil PVC sheet was applied with pressure to produce a four-layered laminate (Mylar-reservoir-adhesive-indicator layer).

When stored at 72° F., the initially white layer of polyvinyl chloride had turned violet in color with a full color change taking about 21 days.

EXAMPLE 2

A polyvinyl chloride plastisol was formulated by mixing the following ingredients in the manner described in Example 1.

| Component | Parts by Weight |
| --- | --- |
| Eastman Dye FFBL #8272 (red) | 4.0 |
| Dioctyl phthalate (plasticizer) | 35.0 |
| Polyvinyl Chloride Resin (#6338) | 60.0 |
| V-1515 | 1.0 |
| Total | 100.0 |

The above plastisol was coated by a Gardner knife as a layer about 3 mils thick on a sheet of mylar which was 2 mils thick. The laminate was then fused at 295° F. to produce a reservoir component consisting of layers 6 and 7 shown in FIG. 2, having dimensions of 8" by 10".

The sheeting was then cut into approximately 1" strips and a "double coated" pressure-sensitive tape (paper-adhesive-mylar-adhesive as explained above) was applied to the Mylar side of the reservoir laminate by means of the exposed adhesive. To the plastisol side of the reservoir laminate was adhered a "single coated" pressure-sensitive tape comprising a pressure-sensitive adhesive and a release paper with the adhesive toward the plastisol. The configuration of the last-formed composite is shown in FIG. 3.

The release paper, indicated as layer 8 in FIG. 3 was then removed from the "single coated" pressure-sensitive adhesive and onto the exposed adhesive was supplied an indicator layer of flexible polyvinyl chloride. Thus, the composite indicator was as shown in FIG. 4 with indicator layer 16 in contact with reservoir layer 15 through adhesive 10.

After being stored at 72° F. (room temperature), the time period for detection of a color change or the lapsed time periods for full color change according to a color equivalent to Pantone 210 of the Printer's Edition of the Pantone Matching System was evaluated. The time periods for a full color change for the various indicator layers provided as shown below:

TABLE 1

| Indicator Layer | First Appearance | Full Change |
| --- | --- | --- |
| 2 mil polyvinyl chloride (PVC) | 4 days | 22 days |
| 3.5 mil PVC | 4 days | 22 days |
| 5.0 mil PVC | 4 days | 22 days |
| 9.5 mil PVC | 4 days | 50 days |
| 14 mil PVC | 4 days | 50 days |

EXAMPLE 3

Example 2 was repeated with the laminates being aged at 100° F. The results of this experiment in terms of times to achieve a perceptible and a full color change are shown below:

TABLE 2

| Indicator Layer | First Appearance | Full Change |
| --- | --- | --- |
| 2 mil PVC | 1 day | 4 days |
| 3.5 mil PVC | 1 day | 7 days |
| 5.0 mils PVC | 1 day | 7 days |
| 9.5 mil PVC | 1 day | 9 days |
| 14 mil PVC | 1 day | 9 days |

EXAMPLE 4

Example 2 was repeated with the dispensers produced being aged at 150° F. Additionally, Korad A, obtained from Rohm and Haas, and rigid polyvinyl chloride indicator layers being additionally tested. The results of this experiment are indicated below in terms of the time for full color change according to the criteria set forth in Example 2.

TABLE 3

| Indicator Layer | First Appearance | Full Change |
| --- | --- | --- |
| 2 mil PVC | 2 hours | 1 day |
| 3.5 mil PVC | 2 hours | 1 day |
| 5.0 mil PVC | 2 hours | 1 day |
| 9.5 mil PVC | 2 hours | 1 day |
| 14 mil PVC | 2 hours | 1 day |
| 3 mil acrylic | 46 hours | 4 days |
| 6 mil acrylic | 6 days | 28 days |
| 4 mil rigid PVC | 21 days | 46 hours |

What is claimed is:

1. A solid, non-porous time indicator comprising a laminate which comprises
   (i) a solid, non-porous polymeric substrate having a first and a second surface; and
   (ii) a layer of a solid, non-porous polymeric composition adhered to the first surface of said substrate and containing an agent capable of migrating throughout said substrate to cause a visually perceptible change in the substrate at the second surface thereof.

2. The time indicator of claim 1, further comprising
   (iii) a second solid, non-porous polymeric substrate adhered to the layer (ii) on the side opposite said substrate (i), wherein said second substrate is a barrier to the migration of said agent.

3. The time indicator of claim 2, wherein said second substrate (iii) is polyethylene terephthalate.

4. The time indicator of claim 1, wherein said substrate (i) is polyvinyl chloride.

5. The time indicator of claim 1, wherein said visually perceptible change is a change in color or shade.

6. The time indicator of claim 1, wherein said agent is an acid, said substrate (i) further comprises a base and an acid-base indicator and said visually perceptible change is a change in color.

7. The time indicator of claim 1, wherein said agent is a base, said substrate (i) further comprises an acid and an acid-base indicator and said visually perceptible change is a change in color.

8. The time indicator of claim 1, wherein said agent is a dye.

9. The time indicator of claim 2, further comprising
   (iv) a pressure-sensitive adhesive layer on the side of said second substrate (iii) opposite layer (ii); and
   (v) a release sheet on the adhesive layer (iv) on the side opposite layer (iii).

10. A method of forming a time indicator comprising bringing the first surface of a solid, non-porous polymeric substrate having a first and a second surface into contact with a layer of a solid non-porous polymeric composition containing an agent capable of migrating throughout said substrate to cause a visually perceptible change in the substrate at the second surface thereof.

11. The method of claim 10, further comprising providing a second solid, non-porous polymeric substrate on the polymeric composition layer on the side opposite said first substrate, wherein said second substrate is a barrier to the migration of said agent.

12. The method of claim 11, wherein said second substrate is polyethylene terephthalate.

13. The method of claim 10, wherein said substrate (i) is polyvinyl chloride.

14. The method of claim 10, wherein said visually perceptible change is a change in color or shade.

15. The method of claim 10, wherein said agent is an acid, said substrate (i) further comprises a base and an acid-base indicator and said visually perceptible change is a change in color.

16. The method of claim 10, wherein said agent is a base, said substrate (i) further comprises an acid and an acid-base indicator and said visually perceptible change is a change in color.

17. The method of claim 10, wherein said agent is a dye.

18. The method of claim 11, further comprising providing a pressure-sensitive adhesive layer on the side of said second substrate opposite said polymeric composition layer and a release sheet on the adhesive layer on the side opposite the second substrate.